United States Patent
Nazimek et al.

(10) Patent No.: US 12,146,112 B2
(45) Date of Patent: Nov. 19, 2024

(54) METHOD FOR OBTAINING METHANE CLATH RATES AND RECOVERING METHANE FROM METHANE CLATH RATES

(71) Applicant: BIOPOLINEX Sp. z o.o., Lublin (PL)

(72) Inventors: Dobiesław Nazimek, Turka (PL); Krzysztof Pietrzak, Lublin (PL); Michał Pietrzak, Lublin (PL); Andrzej Pryzowicz, Lublin (PL)

(73) Assignee: BIOPOLINEX Sp. z o.o., Lublin (PL)

( * ) Notice: Subject to any disclaimer, the term of this patent is extended or adjusted under 35 U.S.C. 154(b) by 326 days.

(21) Appl. No.: 17/615,280

(22) PCT Filed: Jun. 1, 2020

(86) PCT No.: PCT/PL2020/000050
§ 371 (c)(1),
(2) Date: Nov. 30, 2021

(87) PCT Pub. No.: WO2020/242327
PCT Pub. Date: Dec. 3, 2020

(65) Prior Publication Data
US 2022/0195323 A1    Jun. 23, 2022

(30) Foreign Application Priority Data
May 31, 2019  (PL) .......................................... 430107

(51) Int. Cl.
*C10L 3/10* (2006.01)
*B01D 53/14* (2006.01)

(52) U.S. Cl.
CPC .......... *C10L 3/101* (2013.01); *B01D 53/1418* (2013.01); *C10L 2200/0407* (2013.01); *C10L 2290/541* (2013.01)

(58) Field of Classification Search
CPC .............. C10L 3/101; C10L 2200/0407; C10L 2290/541; B01D 53/1418; B01D 2252/20; B01D 2257/7025; B01D 53/1493

USPC .......................................................... 585/835
See application file for complete search history.

(56) References Cited

U.S. PATENT DOCUMENTS

| | | | | |
|---|---|---|---|---|
| 2010/0133280 A1* | 6/2010 | Stein | ...................... | F17C 11/007 141/4 |
| 2011/0185623 A1* | 8/2011 | Cooper | ...................... | C10L 3/06 44/301 |

FOREIGN PATENT DOCUMENTS

| | | |
|---|---|---|
| CN | 107970745 A | 5/2018 |
| EP | 1029910 A1 | 8/2000 |
| EP | 1148289 A1 | 10/2001 |
| RU | 2302401 C1 | 7/2007 |
| WO | 2009101444 A1 | 8/2009 |

OTHER PUBLICATIONS

Kariznovi, M., et al. "Experimental and thermodynamic modeling study on (vapor + liquid) equilibria and physical properties of ternary systems (methane + n-decane + n-tetradecane)" Fluid Phase Equilibria (2012) vol. 334, pp. 30-36.

Srivastan, S., et al. "Solubility of methane in hexane, decane, and dodecane at temperatures from 311 to 423 K and pressures to 10.4 MPa" J. Chem. Eng. Data (1992) vol. 37, No. 4, pp. 516-520.

International Search Report and Written Opinion issued for PCT/PL2020/000050, dated Sep. 9, 2020.

\* cited by examiner

*Primary Examiner* — Prem C Singh
*Assistant Examiner* — Francis C Campanell
(74) *Attorney, Agent, or Firm* — Westman, Champlin & Koehler, P.A.; Z. Peter Sawicki; Amanda M. Prose

(57) ABSTRACT

The method of obtaining methane clathrates consists in the fact that pure methane or methane in a gas mixture not containing hydrocarbons other than methane in amounts not exceeding 1% is contacted with a mixture of alkanes from C7 to C16 and most preferably light paraffin oil containing alkanes from C10 to C14, at a temperature of 5 to 20° C. and absolute pressure above 1 bar, until the solvent is fully saturated.

11 Claims, No Drawings

METHOD FOR OBTAINING METHANE CLATH RATES AND RECOVERING METHANE FROM METHANE CLATH RATES

CROSS-REFERENCE TO RELATED APPLICATION

This Application is a Section 371 National Stage Application of International Application No. PCT/PL2020/000050, filed Jun. 1, 2020 and published as WO/2020/242327 on Dec. 3, 2020, in English, which claims priority to Polish patent application Serial No. P.430107, filed May 31, 2019, the contents of which are hereby incorporated by reference in their entirety.

The object of the invention is a method of obtaining methane clathrates and recovering methane from formed clathrates.

Clathrates are caged compounds in which water molecules form specific cages around gas molecules sometimes they are called ice or snow methane because of their structure and white color reminiscent of snow. Anyhow, methane clathrates were discovered in 1888 with hydrates of ethane, ethylene and nitrous oxide by the French physicist Paul Villard. In the sixties of the twentieth century for the first time we found hydrates deposits in Siberia.

Methane was discovered and isolated by Alessandro Volta in 1776-1778 when he studied wetland gas at Lake Maggiore. It is produced naturally in the anaerobic degradation of plant debris (e.g. in swamp), forming the so-called marsh gas. It is also the main component of mine gas and natural gas (usually ≥90%). The main source of methane is natural gas and coal seams.

The methane molecule has the shape of a tetrahedron. The carbon atom exhibits type sp3 hybridization. The resulting orbitals form bonds with four hydrogen atoms. All these bonds are equal and very weakly polarized, which in combination with the lack of free electron pairs is the reason for the relative chemical stability of this compound as well as the lack of polarization. It can participate only in reactions typical for alkanes.

The structure of methane, lack of polarization, makes it very poorly soluble in water 3.5 g/dm$^3$ at 17oC, slightly better soluble in ethanol, ether and toluene. Classic clathrates, also known as methane hydrates, owe their name to their crystal structure in which water molecules form cages around gas molecules. Pure methane hydrates under earth conditions crystallize in the so-called sI structure, whose unit cell consists of two small (512) and six large cages (51262) containing a total of 46 water molecules. In nature, another structure (sH) is also very rare, where, apart from methane, hydrocarbons with a longer carbon chain (e.g. n-pentane) also enter the cages. Hydrates that crystallize in this form are made of one large (512612), two medium (435663) and three small cells (512). The stability of the above structures is ensured by the appropriate number of gas molecules enclosed in the crystal lattice. At least 70% cage filling is required otherwise decay occurs [All About Hydrates, Chemistry of Natural Methane Hydrate, National Energy Technology Laboratory, 2007 Jul. 9].

Known from the Russian patent RU2302401 (C1) is the method of producing methane clathrates by separating methane from a methane-air mixture using an aqueous hydroquinone solution at specific parameters: pressure 3 MPa and temperature not higher than +2° C.

From patent description WO2009101444 (A1) a method of forming clathrates is known, e.g. methane, hydrogen using a gel forming cage. Gelling agents include cellulose, agarose, carrageenan, polyvinyl alcohol. The gel used is a hydrogel, so gas molecules, e.g. $H_2CH_4$ molecules, are preferably stored in $H_2O$ cages formed in the hydrogel. The formation of clathrates occurs, for example, in a pressure reactor.

A method of liquefying gases using the Olszewski technology, using increasingly lower temperatures, is known. However, this method is expensive and cumbersome.

During the research, it was surprisingly found that methane dissolves perfectly in light paraffin oil.

Paraffin is a mixture of solid alkanes and liquid alkanes containing from 10 to 48 carbon atoms in the molecule, secreted from heavy crude oil fraction with a boiling point over 350° C. or from fraction tar liquids of brown coal. Depending on the degree of refining, the paraffin is light yellow to white. It has the form of crystalline wax (greasy to the touch), insoluble in water and ethanol, but soluble in many other organic solvents (for example in turpentine, ether). It is resistant to acids and alkalis.

Depending on the composition, the following types of paraffin are distinguished:

Liquid paraffin (also called paraffin oil)—colorless and odorless (containing C10 to C14 alkanes, boiling above 250° C.)

Soft paraffin (melting point 45-50° C.)

Hard paraffin (melting point approx. 60° C.)

Paraffins are the common name in the petrochemical industry for aliphatic alkanes (non-cyclic), unlike alkenes called olefins and cycloalkanes called naphthenics. The conducted tests of methane absorption in light paraffin oil using the FTIR technique unexpectedly showed that at temperatures below 20° C., methane forms in this light paraffin oil, already at a relatively low overpressure of 0.1 bar, containing C7-C16 alkanes, preferably alkanes from C10 to C14, a type of metastable sI type clathrates, similar to water hydrates.

Surprisingly, it also turned out that raising the temperature above 20° C. and higher results in the degradation of the metastable clathrate with the release of methane, the faster the higher the temperature of the process, without changes in the paraffin oil itself.

The essence of the invention is that pure methane or methane in a gas mixture that does not contain hydrocarbons other than methane, in amounts not exceeding 1% is contacting with a mixture of alkanes ranging from C7 to C16, and most preferably light paraffin oil containing alkanes from C10-C14, at a temperature of 5 to 20° C., absolute pressure above 1.0 bar, for full saturation of the solvent, preferably up to about 39% by weight.

Preferred gas or gas mixture includes Ar, Kr, $N_2$, $O_2$, $CO_2$, $H_2S$, CO, $H_2$.

Preferably, the reaction proceeds at an absolute pressure of 1.1 bar.

The invention also relates to a method of recovering methane from clathrates obtained, analogously to the invention previously described by dissolving methane in paraffins, in which the obtained clathrates are heated at a temperature above 20° C. and methane is released, which is then guided by means of installation for any fuel receiver e.g. furnace, engine, turbine, generator. While after cooling down to 20° C. the solvent from the clatrates is completely recycled to the process again.

Preferred gas or gas mixture includes Ar, Kr, $N_2$, $O_2$, $CO_2$, $H_2S$, CO, $H_2$.

Preferably, the reaction proceeds at an absolute pressure of 1.1 bar.

Preferably the temperature is increased to 70° C.

Preferably the decomposition temperature is controlled by pressure.

The method of obtaining methane clathrates according to the invention using preferably light paraffin oil allows obtaining stable cage structures with methane, which can be easily stored in these structures for an unlimited time, while maintaining a temperature not exceeding 20° C. In addition, methane clathrates can be easily transported without having to keep very low temperatures during transport.

The invention also provides a method for recovering methane from clathrates by using only elevated temperatures, i.e. above 20° C., preferably up to 70° C.

The present invention provides for effective separation of methane from the gas mixture and enables improvement in the storage, transport/distribution of methane, and recovery of methane and solvent that can be utilized. Solvent after separation of methane and cooling can be recycled to the process or used for other purposes, which causes that no by-products are formed in relation to known methods.

EXAMPLE 1

Obtaining methane clathrates through its absorption in light paraffin oil (liquid paraffin).

Into the bubble absorber ("perlage") with a capacity of 170 dm³ light paraffin oil containing C10 to C14 alkanes with a boiling point of +280° C. was introduced. The process was carried out in the temperature range of 17-20° C., with an overpressure of 0.1 bar.

In exhaust gas system from the absorber a methane sensor reacting to methane concentration above 4 ppm was placed. A mixture of methane and nitrogen gas was used for absorption in a volume ratio of 1:1 (0.6 m³hr $CH_4$+0.6 m³/hr $N_2$) with a total flow through the absorber 1.2 m³/hr. Gases were fed from gas bottle using mass flow regulators scaled for nitrogen and methane flow. After the process, the solvent volume increased to approx. 210 dm³, i.e. by 40 dm³. During the tests, no methane exceedance was observed in the waste gases above the sensitivity of the methane sensor used. Thus, the total methane absorption in the solvent was assumed. After the process was completed, as shown by the calculations, light paraffin oil should contain 14.512% by weight of methane. Calculations of the methane content in the solvent were made for the following assumptions:

$d_s$ (paraffin oil)=0.860 g/cm³—according to the manufacturer—measured at 20° C. -0.891 g/cm³. The measured value was taken for calculations, i.e. $d_s$=0.891 g/cm³.

methane mole -16 g

Avogadro constant -1 mole contained in 22.4 dm³.

$X_{Mole}$=36/0,0224=1607,142857

$X_{kg}$=($X_{Mole}$*16)/1000=25,71428 kg $M_s$=170*$d_s$=151,47 kg $X_{CH4}$=($X_{kg}$/($M_s$+$X_{kg}$))*100%=14,512%

Solvent—light paraffin oil was tested after the process by the FTIR method (FTIR Nicolet iS50 with ATR attachment) and the presence of metastable sl methane clathrates was found. The content of alkanes in the solvent—light paraffin oil was also tested chromatographically using GC Shimadzu GC2010 plus with a plasma detector, ZB-1 capillary column 60 m long (manufacturer Shimadzu) using He (purity 99.9999%) as the carrier gas. The BID detector used for testing guaranteed detection of all gases absorbed in the solvent. The sensitivity of the BID detector working on helium as the carrier gas (99.9999% purity) relative to nitrogen and methane was below 1 ppm. Injection of samples on the chromatographic column was carried out by the automatic method (AOC 20i automatic injection column)—sample size—1μl—dispenser temperature 280° C. Analysis time with ramping up to 300° C.—detector 310° C.—45 minutes. Samples were diluted with n-hexane in a 1:1 ratio with n-hexane, thus constituting an internal standard. The concentration of methane contained in the sample was calculated using previously determined correction factors resulting from the detector characteristics for the hydrocarbons tested—methane and n-hexane, where the correction factor n-hexane in this case was assumed to be $f_1$=1.0 and thus the correction factor for methane $f_2$=9.5. Mathematical statistical analysis of the variability of the results of the determinations was based on the change in the size of the n-hexane peak area and the calculations carried out by the method of least squares, i.e. the Student's t-distribution. It was found that the average weight concentration of methane in the tested samples was $X_{CH4}$=13.791±1.034%. The designated uncertainty area covers the calculation result. At the same time, chromatographic studies showed no change in the composition of paraffin oil used for absorption—called solvent.

The conditions for conducting the process of obtaining clathrates depend on the type of use of the method of contacting the solvent with methane or a mixture of methane together with gases not containing hydrocarbons other than methane. Thus, the contact time of the solvent with the gas or gas mixture also depends on the contacting method used. Any device can be used to contact the solvent with methane.

EXAMPLE 2

The invention also relates to the recovery of methane from clathrates obtained by dissolving methane in paraffins.

The clathrates obtained by the method of the first example were heated at 70° C. in a desorber, which caused the release of methane previously absorbed in the solvent, after which the separated methane was sent to the furnace in which it was used as heating fuel and the light paraffin oil used after cooling to 20° C. was returned whole to be recycled again.

The invention claimed is:

1. A method of obtaining methane clathrates characterized in that pure methane or methane in a mixture of inert gases, which are in amounts not exceeding 1%, is contacted with a mixture of alkanes from C7 to C16 at a temperature of 5 to 20° C. at absolute pressure above 1 bar.

2. The method according to claim 1, characterized in that the gas mixture comprises Ar, Kr, $N_2$, $O_2$, $CO_2$, $H_2S$, CO, $H_2$.

3. The method according to claim 1, characterized in that a reaction takes place at an absolute pressure of 1.1 bar.

4. The method according to claim 1, characterized in that the mixture of alkanes comprises C10 to C14 alkanes.

5. A method of obtaining methane clathrates and recovery (desorption) of methane from clathrates, characterized in that pure methane or methane in a mixture of inert gases, which are in amounts not exceeding 1%, is contacted with a mixture of alkanes from C7 to C16 at a temperature of 5 to 20° C. at absolute pressure above 1 bar, the clathrates thus obtained are heated at a temperature above 20° C. and methane is released, and a solvent is preferably completely recycled.

6. The method according to claim 5, characterized in that the gas or inert gas mixture comprises Ar, Kr, N2, O2, CO2, H2S, CO, H2.

7. The method according to claim 5, characterized in that a reaction takes place at an absolute pressure of 1.1 bar.

8. The method according to claim 5, characterized in that the mixture of alkanes comprises C9 to C14 alkanes.

9. The method according to claim 5, characterized in that the temperature of the clathrates thus obtained is increased to 70° C.

10. The method according to claim 5, characterized in that a decomposition temperature is controlled by pressure.

11. The method according to claim 9, characterized in that a decomposition temperature is controlled by pressure.

* * * * *